United States Patent [19]

Yamaguchi et al.

[11] Patent Number: 5,119,194
[45] Date of Patent: Jun. 2, 1992

[54] COMPENSATING CIRCUIT FOR COMPENSATING DISTORTION OF VIDEO SIGNAL BY DETECTING DISTORTION OF RAMP SIGNAL IN VIDEO SIGNAL

[75] Inventors: Takayoshi Yamaguchi, Nagareyama; Satoru Sagawa, Kashiwa, both of Japan

[73] Assignee: Sharp Kabushiki Kaisha, Osaka, Japan

[21] Appl. No.: 570,151

[22] Filed: Aug. 17, 1990

[30] Foreign Application Priority Data

Aug. 23, 1989 [JP] Japan .................................. 1-216919

[51] Int. Cl.⁵ ............................................. H04N 5/14
[52] U.S. Cl. .................................... 358/166; 358/147
[58] Field of Search ................ 358/166, 167, 174, 36, 358/37, 147

[56] References Cited

U.S. PATENT DOCUMENTS

| | | | |
|---|---|---|---|
| 4,408,233 | 10/1983 | Nahon | 358/166 |
| 4,503,547 | 3/1985 | Summers | 358/166 |
| 4,757,392 | 7/1988 | Awamoto | 358/167 |
| 4,991,021 | 2/1991 | Nikoh | 358/166 |

FOREIGN PATENT DOCUMENTS 63-10982 1/1988 Japan .

OTHER PUBLICATIONS

"Characteristics and Operation of A DLC", National Technical Report, vol. 32, No. 4, issued Aug. 1986, pp. 425-427 (with English translation).

National Technical Report, vol. 32, Aug. 1986 "VTR for High Definition TV of Band Reduction System."

Primary Examiner—Tommy P. Chin
Attorney, Agent, or Firm—David G. Conlin; Robert F. O'Connell

[57] ABSTRACT

A distortion compensation circuit of a VTR detects distortion of an input ramp signal during a blanking period of a reproduced video signal and compensates the distortion of the entire reproduced video signal. The input ramp signal included in the digital reproduced video signal is compared with a comparison ramp signal equal to a ramp signal to be recorded and the difference thereof can be obtained as a compensation data signal. During the blanking period of the reproduced video signal, the compensation data signal is stored in a compensating memory, using the input ramp signal as an address signal, and during a non-blanking period, the contents of the compensating memory are read out, using the reproduced video signal itself as an address signal. The read compensation data signal is added to the reproduced video signal, whereby distortion of the reproduced video signal is compensated.

12 Claims, 6 Drawing Sheets

COMPENSATING CIRCUIT FOR COMPENSATING DISTORTION OF VIDEO SIGNAL BY DETECTING DISTORTION OF RAMP SIGNAL IN VIDEO SIGNAL

BACKGROUND OF THE INVENTION

1. Filed of the Invention

The present invention relates generally to a distortion compensating circuit for compensating distortion of a signal. and more particularly, to a distortion compensating circuit provided in a recording and reproducing apparatus for a video signal such as a video tape recorder (referred to as VTR hereinafter) for compensating nonlinear distortion caused in the video signal caused by characteristics of a modulator, a demodulator, an amplifier and the like included in the recording and reproducing apparatus.

2. Description of the Background Art

Conventionally, it is known that in a video signal recording and reproducing apparatus such as VTR, nonlinear distortion occurs in the video signal in recording and reproducing the video signal due to characteristics of an FM modulator, an FM demodulator, an amplifier and the like. Therefore. proposed is a distortion compensating circuit for compensating, by detecting distortion of a ramp signal previously included in a video signal to be recorded, nonlinear distortion of the reproduced video signal itself, which is disclosed for example, in Japanese Patent Laying-Open No. 63-10982 laid open on Jan. 18, 1988 and in "National Technical Report", pp. 425–427, volume 32. No. 4, issued August 1986.

FIG. 1 is a block diagram schematically explaining signal flow in a reproduction system of a VTR in which such a distortion compensating circuit is used. Four channel video signals reproduced from a magnetic tape 1 by four magnetic heads 2a through 2d are respectively amplified by the corresponding reproducing amplifiers 3a through 3d, and then the amplified reproduced video signals are applied to an equalizer and RF switching circuit 4 wherein the signals are converted into sequential signals of two channels. The two channel reproduced video signals are applied to an FM demodulator 5, wherein they are FM demodulated. The reproduced video signals FM demodulated by the FM demodulator 5 are applied to a time base corrector (TBC) 6, wherein they are converted into digital signals and time bases thereof are corrected. The reproduced video signals converted into the digital signals in the TBC 6 are applied to a distortion compensating circuit (or a digital level compensating circuit DLC) 7. As will be described in detail later, the distortion compensating circuit 7 compensates nonlinear distortion of the reproduced video signals. After the reproduced video signals which nonlinear distortion is compensated are applied to a TCI decoder 8 and subjected to a TCI processing, dropout of the reproduced signals is compensated by a dropout compensating circuit (DOC) 9 and at the same time, the signals are reconverted into analog signals and outputted as a luminance signal Y and two color signals $P_B$ and $P_R$.

FIG. 2 is a schematic block diagram showing the structure of the distortion compensating circuit 7 shown in FIG. 1. In FIG. 2, the distortion compensating circuit 7 receives a digital reproduced video signal applied from the TBC 6 of FIG. 1. This reproduced video signal is applied to a gate circuit 10, wherein input ramp signals Ln included in respective blanking periods of the reproduced video signal are extracted, and then the extracted input ramp signals Ln are applied to an averaging circuit 11. The averaging circuit 11 averages input ramp signals of several fields in response to time base signals Tn supplied from a time base signal source (not shown) in order to reduce noise components included in the reproduced ramp signals and applies the result thereof as a data signal to an RAM 12. In addition, the time base signals Tn are applied to an address input of the RAM 12 and consequently, while being addressed by the time base signals Tn, the RAM 12 stores the averaged input ramp signals as data signals.

In addition, the data signal outputted from the RAM 12 is applied to an address input of an RAM 13 through a switch 15 switched to a terminal 15a during a blanking period of the reproduced video signal, while the time base signal Tn is applied to the data input of the RAM 13. As a result, while using the data signal of the RAM 13 as an address signal, the RAM 13 stores the time base signal Tn as a data signal during the blanking period of the reproduced video signal. Namely, the information for compensating nonlinear distortion based on the input ramp signals is stored in the RAM 13.

Meanwhile, the reproduced video signal from the TBC 6 is applied to the address input of the RAM 13 through the switch 15 switched to a terminal 15b during a non-blanking period of the reproduced video signal. As a result, while using the reproduced video signal as an address signal, the RAM 13 outputs the stored data. The data signals outputted from the RAM 13 are applied to an address input of an ROM 14 and while using the data signals as address signals, the ROM 14 outputs data signals indicative of levels corresponding to the respective addresses.

Namely, the RAM 12 stores the input ramp signals subjected to nonlinear distortion while using the time base signals Tn as address signals and the RAM 13 stores the time base signals Tn while using the data signals corresponding to the input ramp signals as an address signals in such a manner that the address and the data are inverted with respect to the RAM 12. Then, by outputting the data signal corresponding to the time base signal Tn from the RAM 13 while using the reproduced video signal subjected to the nonlinear distortion as the address signal, the data signal which nonlinear distortion is compensated can be obtained.

Meanwhile, the conventional distortion compensating circuit shown in FIG. 2 requires two RAMs 12 and 13 and one ROM 14. These RAMs and ROM require large storage capacities for storing data corresponding to the whole input ramp signal. More specifically, assuming that the input video signal to the distortion compensating circuit is a digital signal of n bits, at least a capacity of $n \times 2^n$ bits is required. Therefore, such a conventional distortion compensating circuit as shown in FIG. 2 is difficult to be made smaller and reducing the manufacturing cost thereof is very difficult. Particularly, such problems are acute for a distortion compensating circuit for processing video signals of multiple channels.

SUMMARY OF THE INVENTION

Therefore, an object of the present invention is to provide a compact and inexpensive distortion compensating circuit.

Another object of the present invention is to reduce a capacity of storing means for use in a distortion compensating circuit.

Briefly stated, the present invention is directed to a distortion compensating circuit in which a difference between an input reference signal and a comparison reference signal, that is, a compensation data signal corresponding to the magnitude of nonlinear distortion of the input signal, is computed, this compensation data signal is stored in a memory, using the input reference signal as an address signal, the compensation data signal is further read out using the input signal as an address signal, so that the read compensation data signal is added to the input signal.

Therefore, a main advantage of the present invention is that not the entire input reference signal but only a difference component between the input reference signal and the comparison reference signal needs to be stored, so that a required storage capacity can be drastically reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
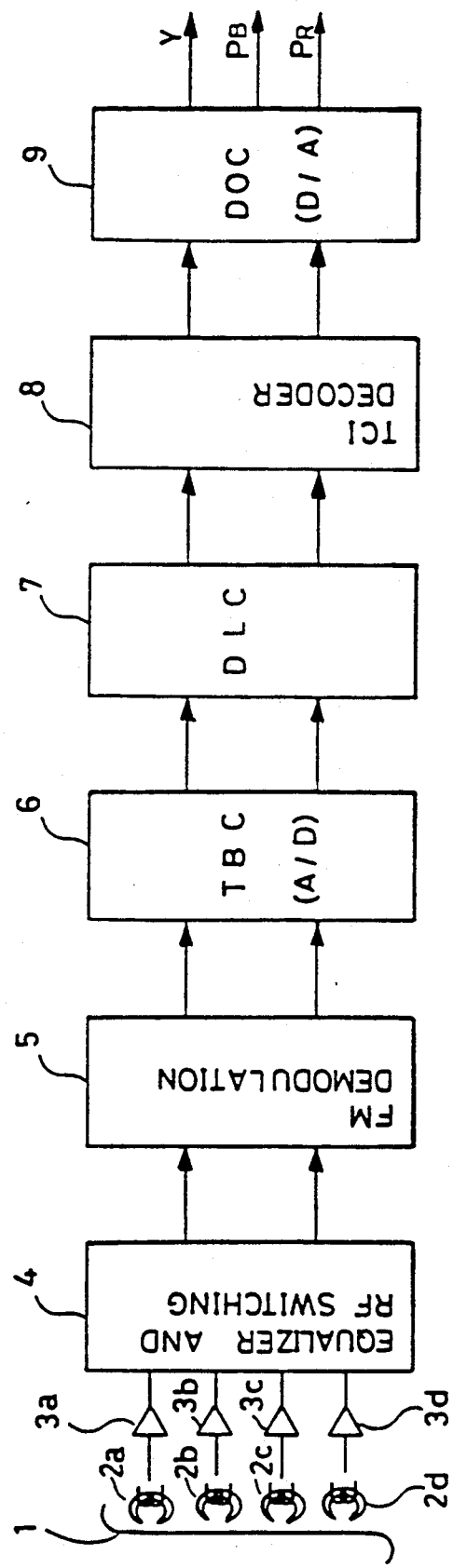
FIG. 1 is a schematic block diagram showing a reproduction system of a VTR.
Figure 3:
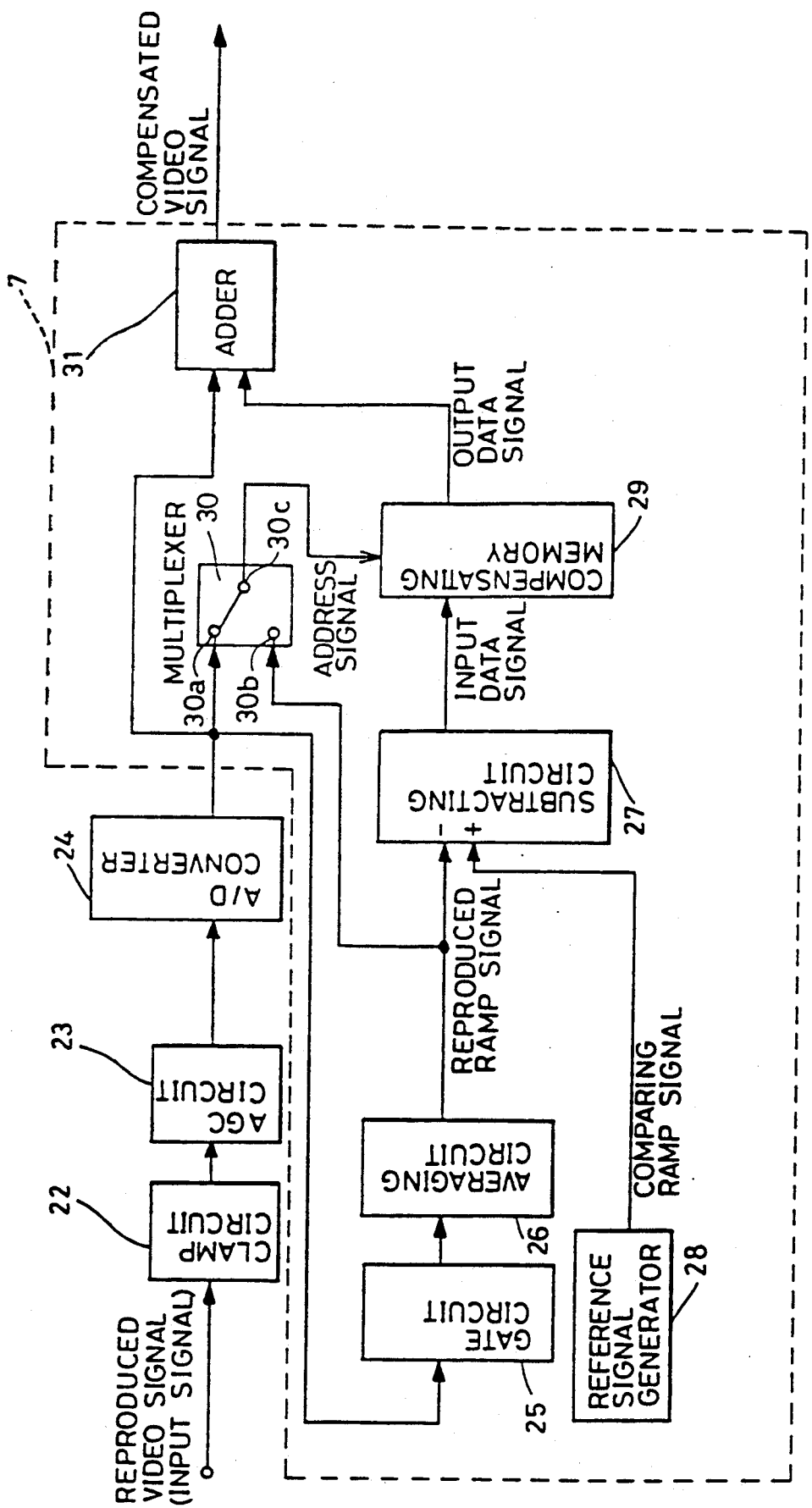
FIG. 3 is a block diagram showing a distortion compensating circuit according to one embodiment of the present invention.
Figure 4:
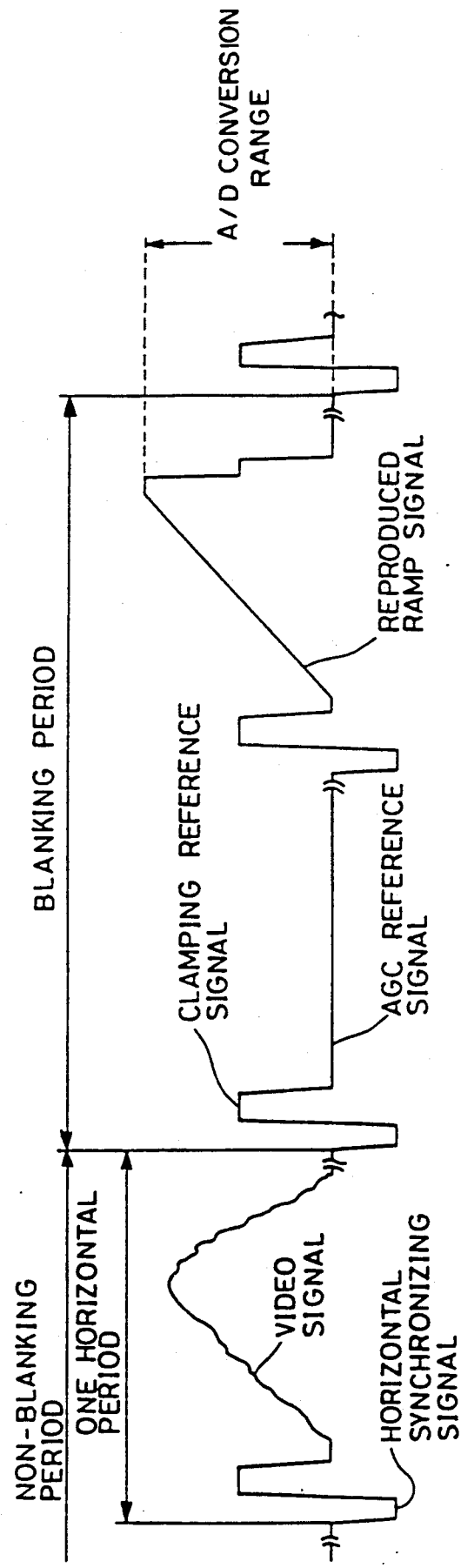
FIG. 4 is a waveform diagram showing a video signal.
Figure 5A:
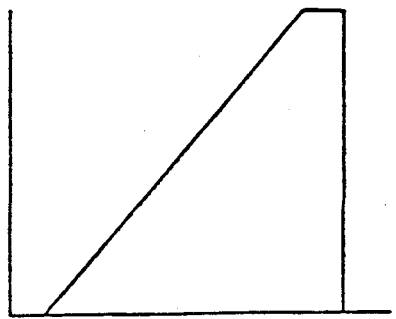
FIG. 5 is a waveform diagram explaining distortion compensation according to the embodiment shown in FIG. 3.
Figure 5B:
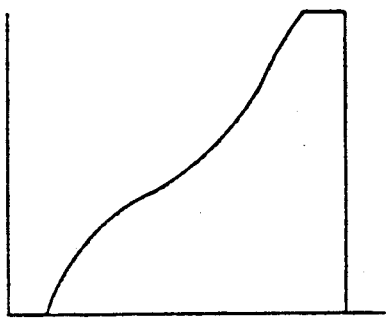
Figure 5C:
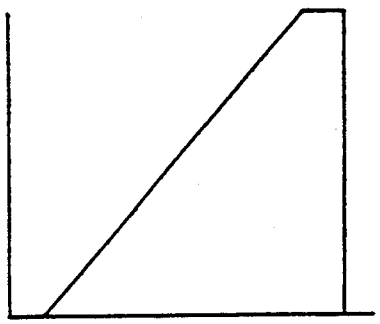
Figure 5D:
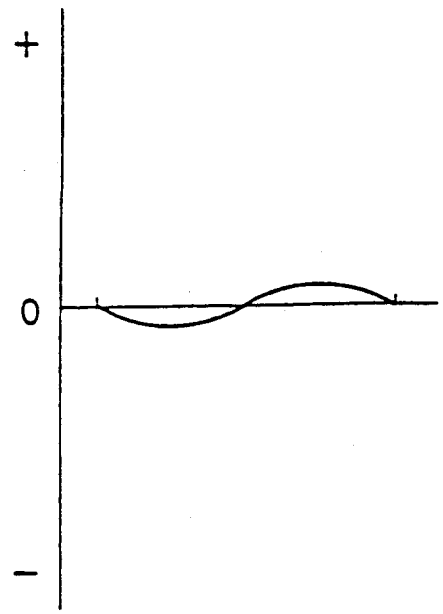
Figure 5E:
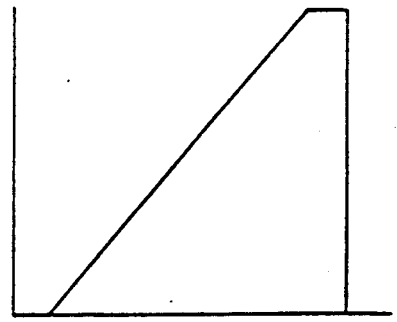

FIG. 3 shows a distortion compensating circuit 7 according to one embodiment of the present invention, which is supposed to be interposed between the TBC 6 and the TCI decoder 8 in the reproduction system of the VTR as in FIG. 1. In addition, the applied reproduced video signal includes a ramp signal which level varies in the range that a video signal can cover as an input reference signal in the blanking period as shown in FIG. 4. In addition, the reproduced video signal includes a clamping reference signal indicative of the intermediate level of the video signal and an AGC reference signal for use in setting the amplitude of the reproduced video signal, as shown in FIG. 4.

Referring to FIG. 3, a clamp circuit 22, an AGC circuit 23 and an A/D convertor 24 are elements provided in the TBC 6 of FIG. 1. The clamp circuit 22 samples the clamping reference signals of FIG. 4 at the same rate as that of a horizontal synchronizing frequency and sets a direct current level of the reproduced video signal to a predetermined level. Then, the AGC circuit 23 detects a difference between a level of the AGC reference signal of the reproduced video signal of FIG. 4 and a level of the above-described clamping reference signal to set the amplitude of the reproduced video signal such that the difference attains a predetermined value. As the AGC reference signal, such a signal as indicating a black level during one horizontal period is used.

Namely, the clamp circuit 22 and the AGC circuit 23 adjust the level of the reproduced video signal so as to be in the range of the A/D conversion by the A/D convertor 24. As a result, the reproduced video signal can take any value represented by the predetermined number of bits and consequently no saturation of the reproduced video signal occurs. The reproduced video signal inputted to A/D convertor 24 is converted every predetermined period into a digital signal comprising data indicative of the level of the inputted reproduced video signal. While in the embodiment of FIG. 3, none of a clamp circuit, an AGC circuit and an A/D convertor is provided in the distortion compensating circuit 7 itself in order to process the digital reproduced video signal outputted from the A/D convertor 24 provided as a part of the TBC 6, these clamp circuit, AGC circuit and A/D convertor may be provided inside the distortion compensating circuit.

The output of the A/D convertor 24 is applied to an adder 31, one input terminal 30a of a multiplexer 30 and a gate circuit 25 in the distortion compensating circuit 7. The gate circuit 25 extract the input ramp signal as an input reference signal included in the blanking period of the reproduced video signal and applies the same to an averaging circuit 26. The averaging circuit 26 averages a signal level value of each of about 16 input ramp signals with respect to the same phase. As a result, the noise components in the input ramp signal is reduced to prevent reduction of an S/N ratio of a reproduced signal caused by compensation.

The output of the averaging circuit 26 is applied to a negative input of a subtracting circuit 27 and also to the other input terminal 30b of the multiplexer 30. The positive input of the subtracting circuit 27 receives a comparing ramp signal as a comparison reference signal generated in a reference signal generator 28. The comparing ramp signal has the same waveform as that of the original recording ramp signal included in the video signal when the video signal is recorded on a recording medium. The substracting circuit 27 outputs the data corresponding to a difference between the input ramp signal inputted to the negative input and the comparing ramp signal inputted to the positive input as described above, as a compensation data signal and applies the same as a data signal to a compensating memory 29. Meanwhile, the address input of the compensating memory 29 receives a signal outputted from a terminal 30c of the multiplexer 30 as an address signal.

Meanwhile, the multiplexer 30 selects the signal inputted to the terminal 30b and applies the same to the compensating memory 29 during the blanking period of the reproduced video signal, and selects the signal inputted to the terminal 30a and applies the same to the compensating memory 29 during the non-blanking period of the reproduced video signal. As a result, while the compensating memory 29 stores the compensation data signal outputted from the subtracting circuit 27, using the input ramp signal outputted from the averaging circuit 26 as an address signal during the blanking period of the reproduced video signal, it outputs the stored compensation data signal, using the reproduced video signal from the A/D convertor 24 as an address signal during the non-blanking period of the reproduced video signal. The compensation data signal outputted from the compensating memory 29 is added to the reproduced video signal from the A/D convertor 24 by the adder 31. Then, the output of the adder 31 is supplied as the compensated reproduced video signal from the distortion compensating circuit 7.

Now, FIG. 5 shows waveform diagrams explaining operations of the embodiment shown in FIG. 3. Referring to FIG. 5, description will be made of the principle of the distortion compensating operation performed by the distortion compensating circuit 7 shown in FIG. 3 in which a video signal is reproduced which is recorded on a magnetic tape with a recording ramp signal having such waveform as shown in FIG. 5 (a) included in the blanking The reproduced video signal includes an input ramp signal which waveform is distorted as shown in, for example, FIG. 5 (b) due to the characteristics of an FM modulator, an FM demodulator and an amplifier of VTR and the like. After a direct current level and an amplitude of this reproduced video signal are respectively set to predetermined magnitudes by the clamp circuit 22 and the AGC circuit 23, the reproduced video signal is converted into a digital signal comprising data indicative of the level of the reproduced video signal by the A/D convertor 24.

Then, during the blanking period of the reproduced video signal, the reference signal generator 28 generates a comparing ramp signal comprising the data having the same waveform as that of the recording ramp signal included in the video signal when the video signal is recorded, in synchronization with the input ramp signal, as shown in FIG. 5 (c).

Then, the input ramp signal and the comparing ramp signal are subtracted by the subtracting circuit 27, thereby obtaining a compensation data signal comprising the data having such a waveform of the distortion component as shown in FIG. 5 (d). This compensation data signal is stored in the compensating memory 29, using the input ramp signal inputted from the averaging circuit 26 as an address signal by connecting the terminal 30b to the terminal 30c of the multiplexer 30 during the blanking period of the reproduced video signal. At this time, when the addresses represented by the address signals become discontinuous due to noise, dropout and the like, the compensation data signals are also stored in the discontinuous address portions by interpolation or the like.

Meanwhile, since the above-described compensation data signal comprises only the data having the waveform of the distortion components, the range of value that the compensation data signal can cover is quite narrow as compared with that the input ramp signal can cover. Therefore, the storage capacity of the compensating memory 29 for storing the compensation data signal can be smaller than that of each memory in the conventional example of FIG. 2. Besides, since with respect to the compensation data signal, the input ramp signal inputted from the A/D convertor 24 through the gate circuit 25 and the averaging circuit 26 is directly stored as a data signal in the compensating memory 29, unlike the conventional example of FIG. 2, additional memories and the like are not required for inverting the addresses and the data.

During the non-blanking period of the reproduced video signal, it is assumed that a video signal is reproduced having a distorted waveform as that of the input ramp signal shown in FIG. 5 (b), for example. In this case, the reproduced video signal outputted from the A/D convertor 24 is applied as an address signal to the address input of the compensating memory 29 by connecting the terminal 30a to the terminal 30c of the multiplexer 30. As a result, the compensating memory 29 outputs the compensation data signal corresponding to the data indicative of the level of the reproduced video signal an applies the same to one input of the adder 31 during the non-blanking period of the reproduced video signal.

In addition, the other input of the adder 31 directly receives the reproduced video signal outputted from the A/D convertor 24 and adds the same to the above-described compensation data signal. As a result, as shown in FIG. 5 (e), the compensated video signal having the data indicative of the level at which distortion is compensated is outputted from the adder 31. While in the example of FIG. 5, for convenience sake, the description is made of a case in which the reproduced video signal having the same waveform as that of the input ramp signal is subjected to the distortion compensation, the same distortion compensation may be carried out for video signals having various waveforms in each horizontal period of FIG. 4.

Figure 2:
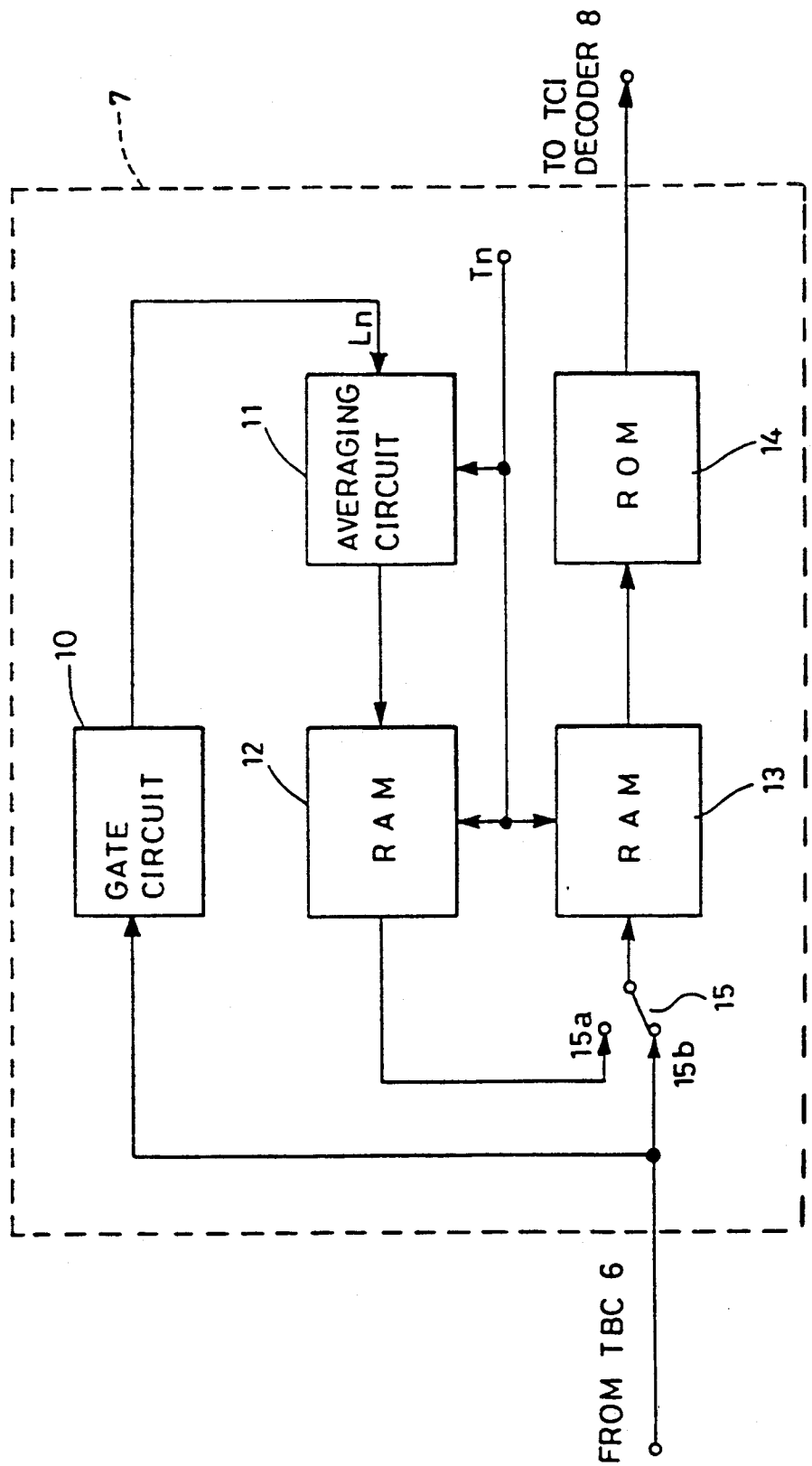
FIG. 2 is a schematic block diagram showing an arrangement of a distortion compensating circuit shown in FIG. 1.

As to the foregoing, according to one embodiment of the present invention shown in FIG. 3, since a difference component between the input ramp signal and the comparing ramp signal is stored as compensation data, the storage capacity of the compensating memory 29 can be reduced, for example, to or less than about ⅓ as compared with such a case where the input ramp signal itself is stored as the conventional example of FIG. 2. Besides, only one compensating memory is required.

Figure 6:
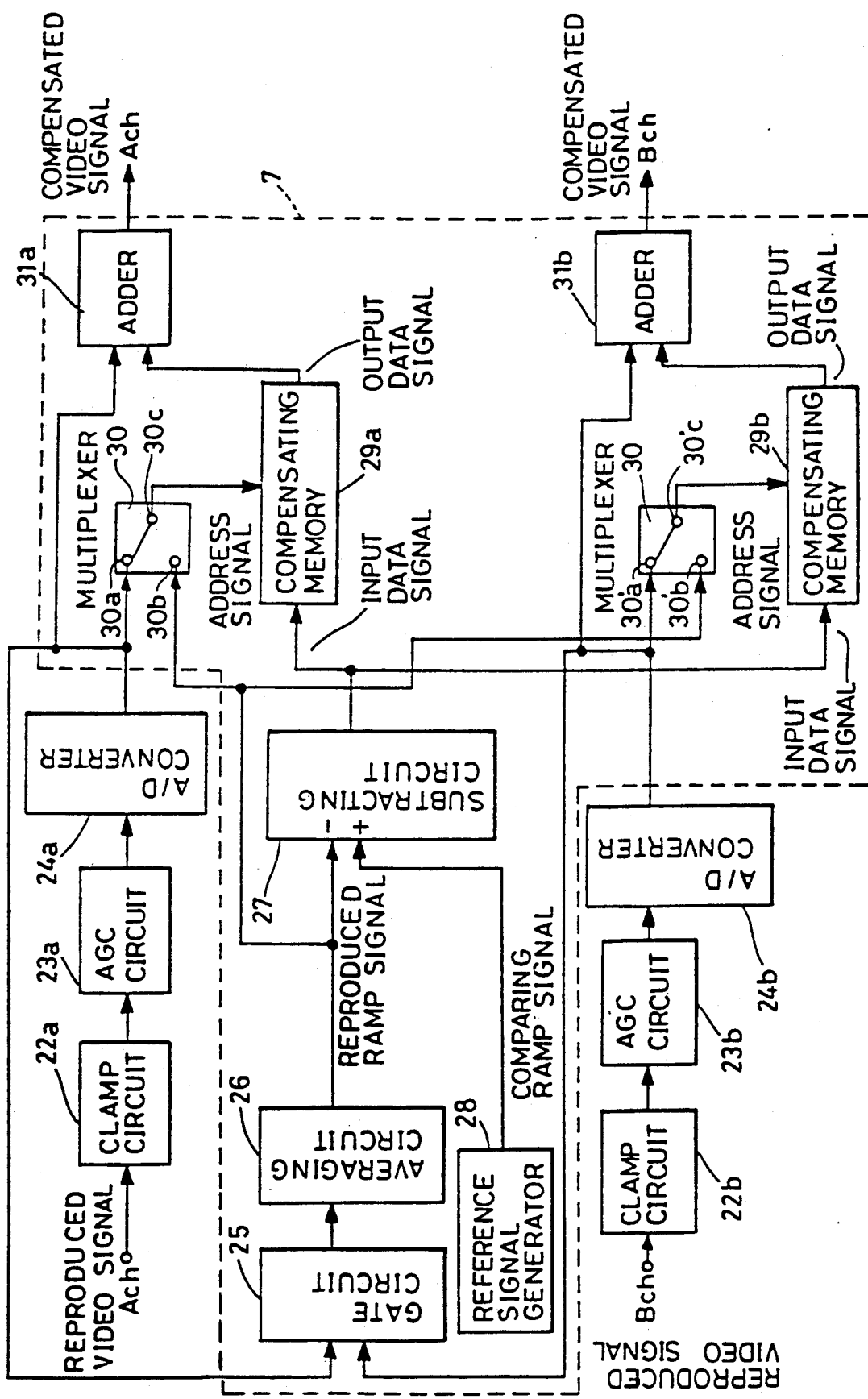
FIG. 6 is a block diagram showing a distortion compensating circuit according to another embodiment of the present invention.

Now, FIG. 6 is a block diagram showing a distortion compensating circuit according to another embodiment of the present invention. The embodiment of FIG. 6 shows the distortion compensating circuit for compensating distortion of video signals of two channels A and B. First, reproduced video signals of the A and B channels are applied to the distortion compensating circuit 7 from an A/D convertor 24a and an A/D convertor 24b, respectively. Both the reproduced video signals of the A channel and the B channel are applied to a gate circuit 25 whereby input ramp signals of the A and B channels are sequentially extracted in a time divisional manner, and the extracted input ramp signals are applied to an averaging circuit 26. The following operation is basically the same as that of the embodiment shown in FIG. 3 except for that the operation is performed in a time divisional manner with respect to the two channels A and B. Then, an output of a subtracting circuit 27 is stored in memories 29a and 29b for compensating the corresponding channels to obtain compensated video signals for respective channels. Namely, in the embodiment shown in FIG. 6, the structure can be simplified even in processing video signals of a plurality of channels.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A distortion compensation circuit for compensating distortion of an input signal to which an input reference signal is partially interposed the level of which varies in a predetermined range and in a predetermined manner, comprising:

means for supplying said input signal in the form of a digital signal, means for supplying a comparison reference signal corresponding to said input reference signal in the form of a digital signal, means for extracting said input reference signal from said supplied digital input signal, substracting means for computing a difference between said extracted input reference signal and said supplied comparison reference signal and outputting the same as a compensation data signal;

compensation data storing means for storing the compensation data signal outputted from said substracting means, using said extracted input reference signal as a first address signal, and for outputting the stored compensation data signal, using said supplied digital input signal as a second address signal, and adding means for adding the compensation data signal supplied from said compensation data storing means to said digital input signal and supplying the result thereof as a compensated input signal.

2. The distortion compensating circuit according to claim 1, wherein said input signal is a signal including said input reference signal during a specific periodical period.

3. The distortion compensating circuit according to claim 2, wherein said means for supplying the input signal comprises analog-digital converting means for converting said input signal in the form of an analog signal into said digital signal.

4. The distortion compensating circuit according to claim 2, further comprising averaging means for averaging said extracted input reference signals and applying the same to said subtracting means.

5. The distortion compensating circuit according to claim 2, further comprising selecting means to be switched such that said extracted input reference signal is supplied as said first address signal to said compensation data storing means during said specific periodical period and such that said supplied digital input signal is supplied as said second address signal to said compensation data storing means during a period other than said specific periodical period.

6. The distortion compensating circuit according to claim 2, wherein said input signal is a video signal periodically including an input ramp signal as said input reference signal during said specific periodical period.

7. A distortion compensation circuit for compensating distortion of input signal of a plurality of channels, each input signal having an input reference signal partially interposed therein the level of which varies in a predetermined range and in a predetermined manner, said distortion compensating circuit comprising:

means for supplying said input signals of the plurality of channels in the form of digital signals, means for supplying a comparison reference signal corresponding to said input reference signal in the form of a digital signal, means for sequentially extracting said input reference signals from respective ones of said supplied input signals of the plurality of channels in a time divisional manner, substracting means for computing a difference between said extracted input reference signal of the corresponding channel and said supplied comparison reference signal and outputting the same as a compensation data signal, of the corresponding channel, a plurality of compensation data storing means each provided for each of said plurality of channels for storing the compensation data signal of the corresponding channel, with the input reference signal extracted from the input signal of the corresponding channel as a first address signal, and outputting the stored compensation data signal of the corresponding channel, with the input signal of the corresponding channel as a second address signal, and adding means provided for each of said plurality of channels for adding said compensation data signal of the corresponding channel supplied from said compensation data storing means and said supplied digital input signal of the corresponding channel and supplying the result thereof as a compensated input signal.

8. The distortion compensating circuit according to claim 7, wherein each of said input signals is a signal including said input reference signal during a specific periodical period.

9. The distortion compensating circuit according to claim 8, wherein each of said means for supplying the input signal includes analog-digital converting means for converting said analog input signal into said digital signal.

10. The distortion compensating circuit according to claim 8, further comprising averaging means for averaging said extracted input reference signals of the corresponding channels and applying the same to said subtracting means.

11. The distortion compensating circuit according to claim 8, further comprising a plurality of selecting means provided for respective ones of said plurality of channels to be switched such that said extracted input reference signal is supplied as said first address signal to said compensation data storing means during said specific period and such that said supplied digital input signal is supplied as said second address signal to said compensation data storing means during a period other than said specific periodical period.

12. The distortion compensating circuit according to claim 8, wherein each of said input signals is a video signal periodically including a ramp signal as said input reference signal during a specific periodical period.

* * * * *